(12) United States Patent
Holehan

(10) Patent No.: US 6,711,647 B1
(45) Date of Patent: Mar. 23, 2004

(54) COMPUTER SYSTEM HAVING INTERNAL IEEE 1394 BUS

(75) Inventor: Steven D. Holehan, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 500 days.

(21) Appl. No.: 09/817,638

(22) Filed: Mar. 26, 2001

(51) Int. Cl.[7] .......................... G06F 13/00; G06F 13/40
(52) U.S. Cl. ...................... 710/306; 710/313; 710/310; 370/402
(58) Field of Search .................. 710/305, 306, 710/300, 303, 310, 62, 72, 52, 304, 313, 315; 712/33; 370/906, 402; 361/679–686, 724; 713/300; 345/501

(56) References Cited

U.S. PATENT DOCUMENTS

| 5,968,172 | A | * | 10/1999 | Aleshi |
| 6,185,520 | B1 | * | 2/2001 | Brown et al. |
| 6,301,632 | B1 | * | 10/2001 | Jaramillo |
| 6,356,965 | B1 | * | 3/2002 | Broyles et al. |
| 6,425,021 | B1 | * | 7/2002 | Ghodrat et al. |
| 6,567,876 | B1 | * | 5/2003 | Stufflebeam |

* cited by examiner

Primary Examiner—Gopal C. Ray

(57) ABSTRACT

A computer system that includes a computer chassis containing an IEEE 1394 bus and peripheral devices. The computer system includes a CPU, a memory, and a bridge logic unit coupling the CPU to the memory. Peripheral devices in the computer system chassis couple to the bridge logic unit through the IEEE 1394 bus. The bridge logic unit couples directly to the peripheral devices in the computer chassis. The bridge logic unit includes a memory controller, CPU interface, IEEE 1394 interface and AGP interface. The IEEE 1394 interface couples to the IEEE 1394 bus. The bridge logic unit includes a number of queue storage elements that couple the IEEE 1394 interface to the memory controller, CPU interface, and AGP interface.

14 Claims, 4 Drawing Sheets

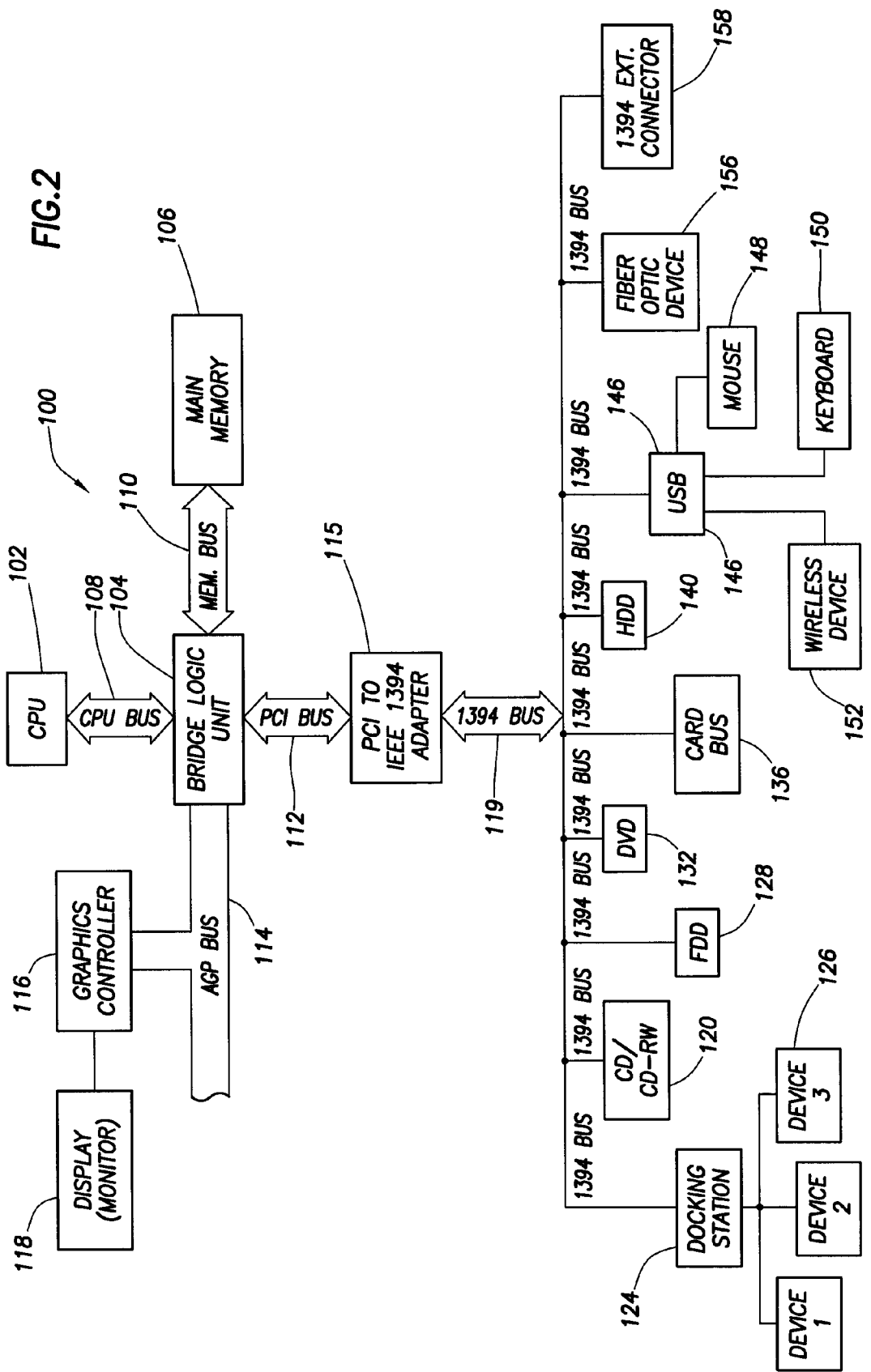

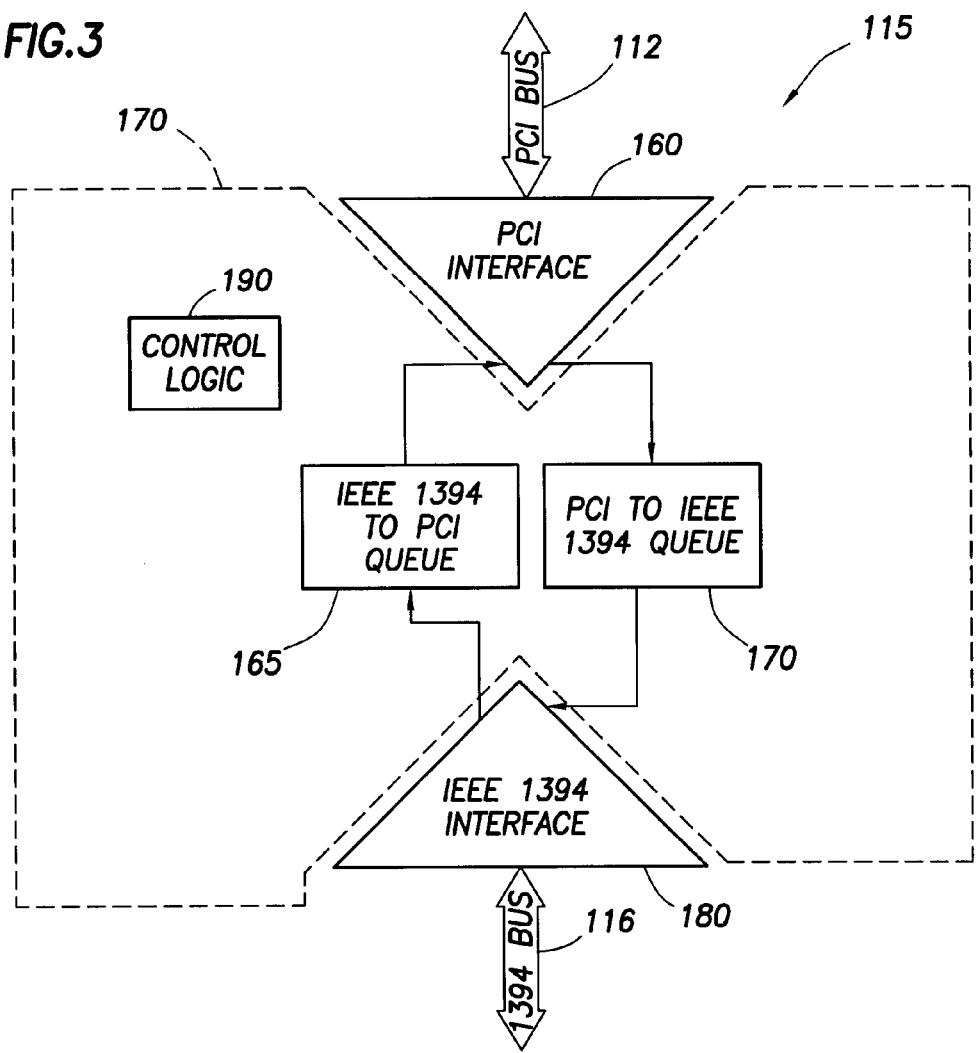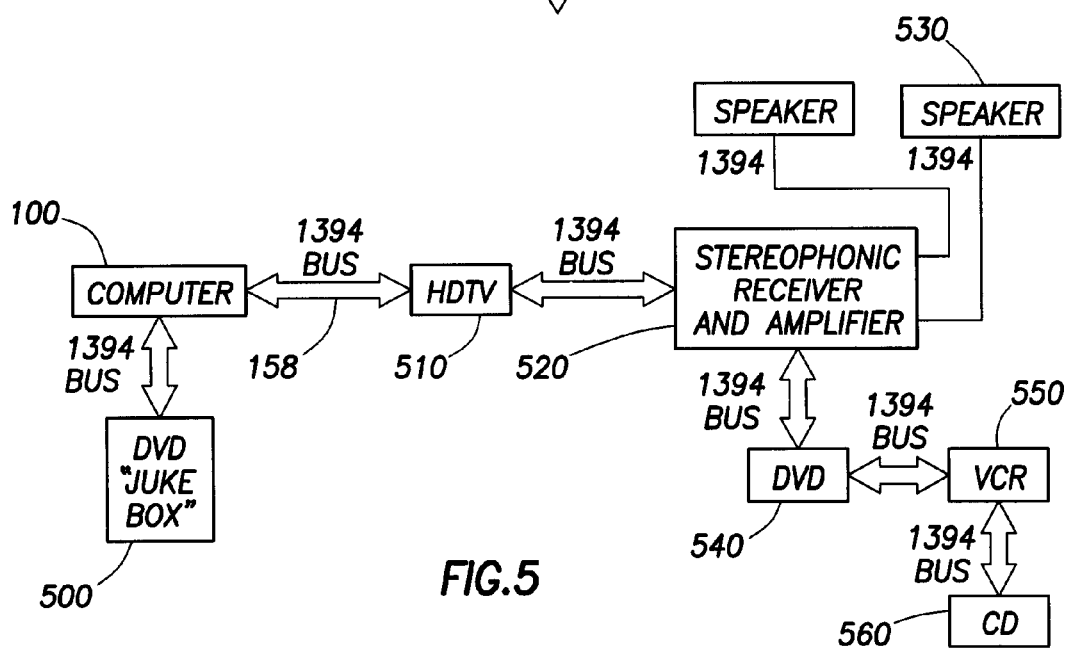

COMPUTER SYSTEM HAVING INTERNAL IEEE 1394 BUS

TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to computer systems and, more particularly, to a new use of the IEEE 1394 Peripheral Interface Bus. Still more particularly the present invention relates to implementation of the IEEE 1394 Peripheral Interface Bus as an internal computer bus, rather than its intended application as a high speed external peripheral serial interconnect bus.

2. Background of the Invention

A personal computer system includes a number of components with specialized functions that cooperatively interact to produce the many effects available in modern computer systems. Early computer systems had relatively few components. As an example, some of the early computer systems included a processor (or CPU), random access memory (RAM), and certain peripheral devices such as a floppy drive, a keyboard and a display. These components typically were coupled together using a network of address, data and control lines, commonly referred to as a "bus."

As computer technology evolved, it became common to connect additional peripheral devices to the computer to provide greater functionality. FIG. 1 shows a representative prior art computer system that includes a CPU coupled to a bridge logic unit via a CPU bus. The bridge logic unit is sometimes referred to as a "North bridge" for no other reason than it often is depicted at the upper end of a computer system drawing. The North bridge also couples to the main memory array by a memory bus. The North bridge couples the CPU and memory to the peripheral devices in the system through a PCI bus or other expansion bus (such as an EISA bus). The North bridge interconnects and controls the flow of information between the CPU, the memory, the PCI bus, and other buses and devices as desired. Various components that understand PCI protocol may reside on the PCI bus, such as a graphics controller.

The various buses shown in FIG. 1 allow the internal subsystems of the computer system to communicate. Use of different bus architectures such as PCI bus, AGP bus, and CPU bus results in an added layer of complexity caused by remapping of signal lines and increased complexity of the North bridge chip. Furthermore, each bus experiences performance bottlenecks, causing the overall performance of the computer system to degrade. For example, the PCI bus architecture is a parallel bus architecture in which multiple bytes of data are transferred in parallel. The PCI bus architecture permits data transfer rates between 33 MHz up to a maximum of 66 MHz. Thus, the computer system may be forced to operate at a maximum clock speed of 66 MHz even if all other buses and hardware operate at a much higher clock speed. Furthermore, because the PCI bus architecture permits only 32 bits of data to pass during a clock cycle, other components can only process 32 bits of data in a clock cycle even though the component is capable of much higher processing. The electrical design of the computer system is made more complex because the electrical characteristics of each bus may vary. For example, the design of a computer system that supports the PCI, AGP, and CPU bus requires that each data line corresponding to a bit be impedance matched to chips coupled to the bus. Data lines in each of the buses may have different impedance matching requirements resulting in extremely complex bridging circuits. Furthermore, each type of bus may also have specific timing requirements that are very tight toleranced and bridging of these timing requirements may result in lost clock cycles and complex bridging circuits.

One solution that reduces the complexity of computer system design caused by the use of a large number of different buses is to replace the PCI bus with a generic busing architecture that is capable of attaching to preexisting peripheral devices. Such a generic bus would couple to the North Bridge and ideally be able to directly connect to a large number of peripheral devices. Despite the simplification of the computer system design along with the apparent performance advantages of such a system, to date no such system has been implemented.

BRIEF SUMMARY OF THE INVENTION

The problems noted above are solved in large part by a computer system that includes a computer chassis containing an IEEE 1394 bus and peripheral devices. The computer system preferably further includes a CPU, a memory, and a bridge logic unit coupling the CPU to the memory. Peripheral devices in the computer system chassis couple to the bridge logic unit through the IEEE 1394 bus. Some exemplary peripheral devices include a mouse, a fiber optic device, a docking station, a Compact Disc-Rewritable ("CD-RW") device, a Digital Versatile Disc ("DVD") device, a Floppy Disk Drive ("FDD") device, and an IEEE 1394 external connector.

In one exemplary embodiment, a PCI-to-IEEE 1394 adapter couples the bridge logic unit to the peripheral devices. The bridge logic unit connects to the PCI-to-IEEE 1394 adapter through a PCI bus and the PCI-to-IEEE 1394 adapter connects to the peripheral devices through an IEEE 1394 bus. Preferably, the PCI-to-IEEE 1394 adapter includes a PCI interface coupled to the PCI bus and an IEEE 1394 interface coupled to the IEEE 1394 bus. Queue storage elements connect the PCI interface and IEEE 1394 interface.

In another exemplary embodiment, the bridge logic unit includes the functionality of the PCI-to-IEEE 1394 adapter and directly connects to the peripheral devices in the computer system chassis. A memory bus couples the memory to the bridge logic unit and a CPU bus couples the CPU to the bridge logic unit. The bridge logic unit includes a memory controller, a CPU interface, an IEEE 1394 interface and an AGP interface. The IEEE 1394 interface in the bridge logic unit couples to the IEEE 1394 bus and the AGP bus couples a graphics controller to the bridge logic unit. The bridge logic unit includes a plurality of queue storage elements that couple the IEEE 1394 interface to the memory controller, CPU interface, and AGP interface.

BRIEF DESCRIPTION OF THE DRAWINGS

For a detailed description of the preferred embodiments of the invention, reference will now be made to the accompanying drawings in which:

FIG. 2 is a block diagram of a computer system constructed in accordance with the preferred embodiment of the present invention using an internal IEEE 1394 bus to couple together peripheral devices;

FIG. 3 is a block diagram of one exemplary embodiment of the bridge logic unit of FIG. 2 including PCI and IEEE 1394 interfaces and data and address queues between the interfaces and memory controller;

FIG. 5 shows the computer system of FIG. 2 connected to devices of a home entertainment system using the IEEE 1394 bus.

NOTATION AND NOMENCLATURE

Figure 1:
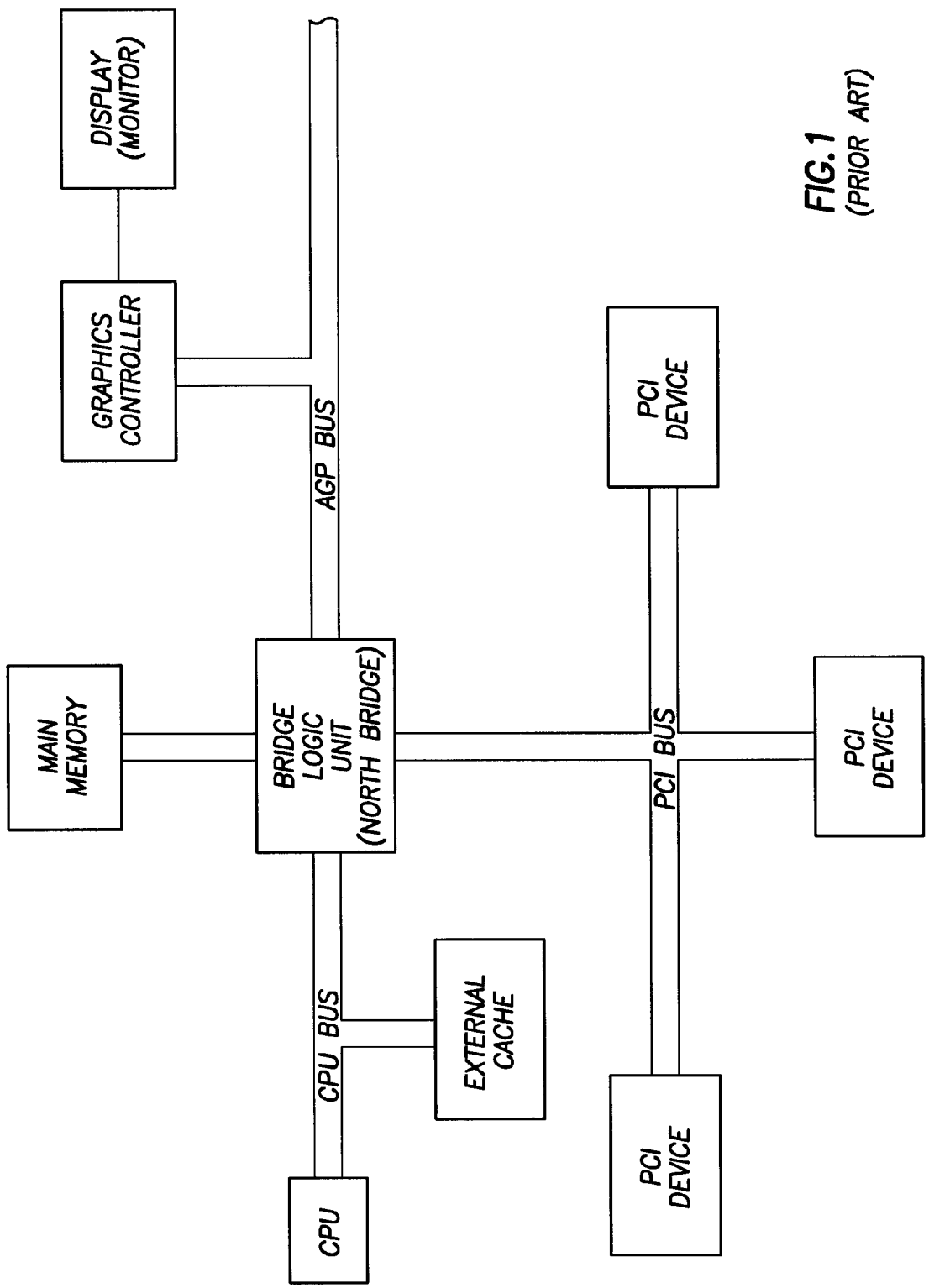
FIG. 1 is a block diagram of a prior art computer system implementing a bridge logic to couple together dissimilar busses.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. In addition, for purposes of this disclosure, the terms "transaction" and "cycle" are generally used synonymously. To the extent that any term is not expressly defined, the intent is to give that term its ordinary interpretation.

DESCRIPTION OF THE PREFERRED EMBODIMENTS

Referring now to FIG. 2, a computer system 100 generally includes a central processing unit ("CPU") 102 coupled to a variety of system components through an integrated bridge logic unit 104. The CPU 102 couples to the bridge logic unit 104 via a CPU bus 108. As shown, a main memory 106 couples to the bridge logic unit 104 through a memory bus 110, and a graphics controller 116 couples to the bridge logic unit 104 through an Advanced Graphics Port ("AGP") bus 114. A display device (or monitor) 118 couples to the graphics controller 116. A PCI-to-IEEE 1394 adapter 115 couples to the bridge logic unit 104 through a Peripheral Component Interconnect ("PCI") bus 112. Additionally, a plurality of peripheral devices couple to the PCI-to-IEEE 1394 Adapter 115 through an IEEE 1394 bus 119.

Referring still to FIG. 2, the CPU 102 is illustrative of, for example, a Pentium® III microprocessor. It should be understood, however, that other alternative types of microprocessors could be employed. Further, an embodiment of computer system 100 may include a multiple CPU architecture, with a plurality of processors coupled through the CPU bus 108 to the bridge logic unit 104. In addition, the CPU 102 and the bridge logic unit 104 may be integrated, so that the functions of these two components reside on a single semiconductor substrate.

The main memory 106 generally includes a conventional memory device or an array of memory devices in which application programs and data are stored during normal system operations. The main memory 106 functions as the working memory of the CPU 102 and other devices in the computer system. Computer system 100 includes any suitable type of memory devices, such as dynamic random access memory ("DRAM") or any of the various types of DRAM circuits such as synchronous dynamic random access memory ("SDRAM"), double data rate dynamic random access memory ("DDR DRAM"), or the like.

The peripheral devices that couple to the PCI-to-IEEE 1394 Adapter 115 through an IEEE 1394 bus 119 may include any of a variety of devices such as, for example CD-ROM ("CD") or CD-ROM READ/WRITE ("CD-RW") 120, Floppy Disk Drive ("FDD"), Digital Versatile Disc ("DVD"), a card bus adapter, hard disk drive ("HDD"), or a docking station 124 allowing connection to a plurality of portable devices 126 such as a PDA or notebook computer. The peripheral devices may also include a fiber optic device 156, 1394 external connector for coupling through 1394 external cable (not shown) to peripheral devices, or a mouse 148, keyboard 150 or wireless device 152 coupled through a Universal Serial Bus ("USB") 146 to the IEEE 1394 bus 119.

Referring still to FIG. 2, the graphics controller 116 controls the rendering of text and images on display 118. Graphics controller 116 may embody a typical graphics accelerator generally known in the art to render three-dimensional data structures on display 118. These data structures can be effectively shifted into and out of main memory 106. The graphics controller 116 therefore may be a master of the AGP bus 114 in that it can request and receive access to a target interface within the bridge logic unit 104 to thereby obtain access to main memory 106. A dedicated graphics bus accommodates rapid retrieval of data from main memory 106. Display 118 is any electronic display device upon which an image or text can be represented. A suitable display 118 may include, for example, a cathode ray tube ("CRT"), a liquid crystal display ("LCD"), or a virtual retinal display ("VRD"), or any other type of suitable display device for a computer system.

The following discussion describes an embodiment of computer system 100 for coupling together various computer buses. Computer system 100 can be implemented with respect to the particular bus architectures shown in FIG. 2 (i.e., PCI and IEEE 1394 buses), or other bus architectures, as desired. As described herein, buses 112 and 119 represent a PCI bus and an IEEE 1394 bus, as shown in FIG. 2. Further, CPU 102 is assumed to be a Pentium® III processor and thus CPU bus 108 represents a Pentium® III bus. These bus protocols and the terminology used with respect to these protocols are well known to those of ordinary skill in the art. If a more thorough understanding of the PCI, IEEE 1394 or Pentium® Pro buses is desired, reference should be made to the *PCI Local Bus Specification* (1993), *IEEE Standard for a High Performance Serial Bus* (1996), and *Intel P6 External Bus Specification*.

Referring now to FIG. 3, PCI-to-IEEE 1394 adapter 115 generally includes a PCI interface 160, an IEEE 1394 interface 180, and queue storage and control logic 170. As shown, the PCI interface 160 preferably couples the PCI-to-IEEE 1394 adapter 115 to the PCI bus 112 and also coordinates the transfer of data, address and control signals between the PCI-to-IEEE 1394 adapter 115 and PCI bus 112. The IEEE 1394 interface 180 in similar fashion interfaces the PCI-to-IEEE 1394 adapter 115 to the IEEE 1394 bus 116.

The queue storage and control logic 170 includes various queue storage elements interconnecting the PCI interface 160 and IEEE 1394 interface 180. A PCI-to-IEEE 1394 queue 170 and an IEEE 1394-to-PCI queue 165 couple the PCI interface 160 to the IEEE 1394 interface 180. A control logic unit 190 controls the operation of the various queue storage elements. The input and output connections to the control logic unit 190 have been omitted from FIG. 3 as have the various control signals between the PCI interface 160 and IEEE 1394 interface 180.

Generally, the queue storage elements allow data and data transaction requests (such as PCI reads and writes to peripheral devices, IEEE 1394 peripheral device reads and writes to main memory, etc.) to be temporarily stored pending execution by the destination device, thereby permitting the requesting device to perform other tasks until its transaction request is completed. Operation and storage of data transactions in the queue storage elements preferably occurs concurrently allowing data and data transaction requests (including addresses for write requests) among the PCI interface 160 and the IEEE 1394 interface 180 to be stored within the PCI-to-IEEE 1394 adapter 115.

Concurrent storage of data and transaction requests in the queue storage elements 165 and 170 permits each queue storage element to hold data and transaction requests at the same time. Thus, each queue storage element can store data and requests independent of all other queue storage elements. By including queue storage elements between the interfaces 160 and 180 as shown in FIG. 3, and permitting each queue storage element to store data and transaction requests concurrently with all other queue storage elements, the performance of the computer system 100 can be improved. This improvement results from passing data and transaction requests between buses 112, 116 in a more efficient manner. Moreover, traffic between buses is handled more efficiently by maximizing the utilization rate of data paths between pairs of buses (i.e., the percentage of time data and transaction requests pass between one bus and another).

Figure 4:
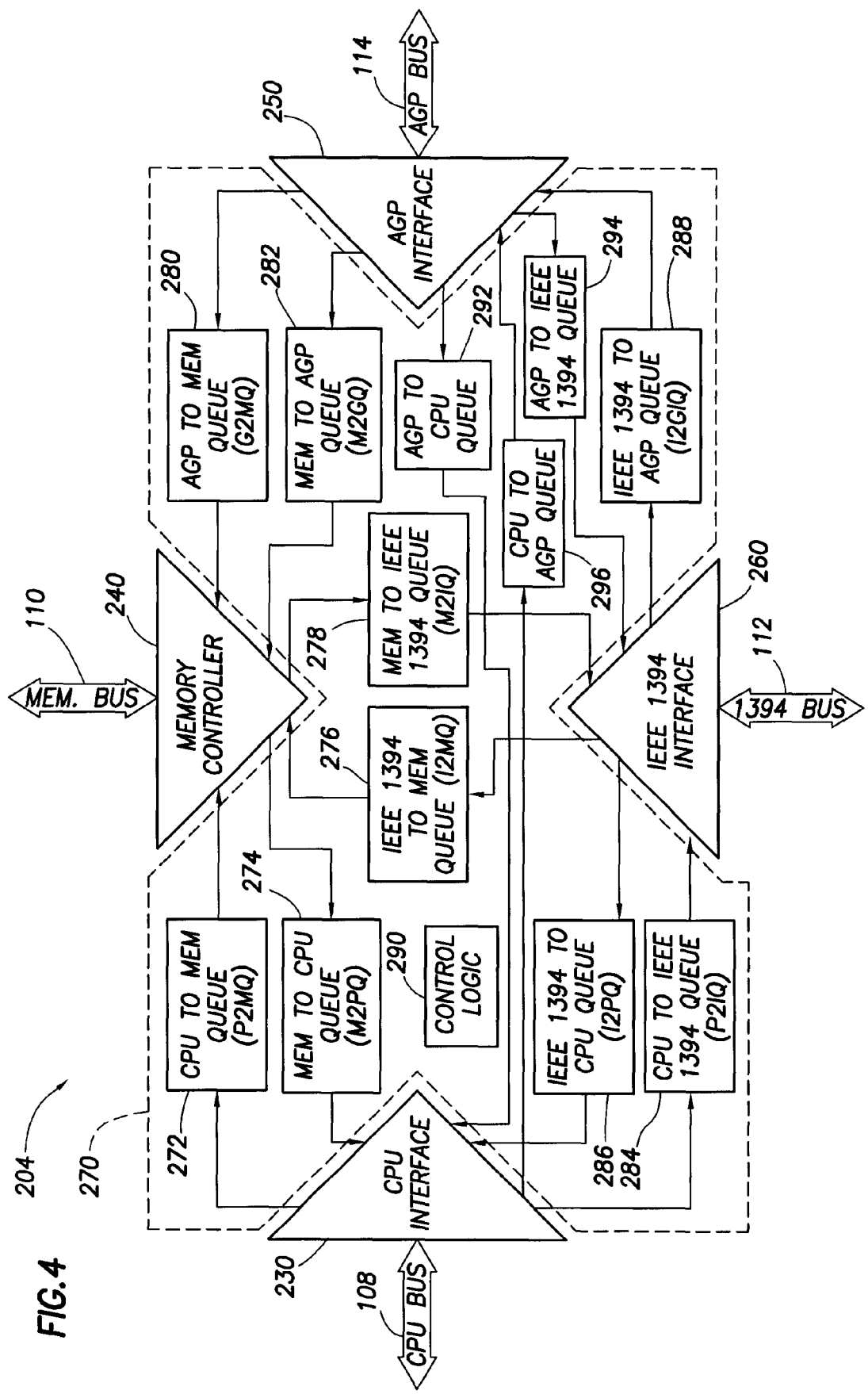
FIG. 4 is a block diagram of another exemplary embodiment of the bridge logic unit incorporating the IEEE 1394 adapter and including CPU and AGP interfaces and data and address queues between the interfaces and memory controller.

Another exemplary embodiment of the invention eliminates the PCI-to-IEEE 1394 adapter 115 of FIG. 2 and directly couples the bridge logic unit to IEEE 1394 peripheral devices through the IEEE 1394 bus. As shown in FIG. 4, the bridge logic unit 204 in this embodiment of the invention includes the functionality of the PCI-to-IEEE 1394 adapter 115. Bridge logic unit 204 generally includes a CPU interface 230, a memory controller 240, an AGP interface 250, an IEEE 1394 interface 260, and queue storage and control logic 270. As shown, the CPU interface 230 preferably couples the bridge logic unit 204 to the CPU bus 208 and also coordinates the transfer of data, address and control signals between the bridge logic 204 and CPU bus 208. The AGP interface 250 and IEEE 1394 interface 260 in similar fashion interface the bridge logic 204 to the AGP bus 214 and PCI bus 212, respectively. Finally, the memory controller 240 couples to the memory bus 210 and communicates with main memory 106 (FIG. 2).

The queue storage and control logic 270 of the exemplary embodiment shown in FIG. 4 includes various queue storage elements interconnecting the CPU interface 230, memory controller 240, AGP interface 250, and IEEE 1394 interface 260. A CPU-to-memory queue (P2MQ) 272 and a memory-to-CPU queue (M2PQ) 274 couple the CPU interface 230 to the memory controller 240. An IEEE 1394-to-memory queue (I2MQ) 276 and a memory-to-IEEE 1394 queue (M2IQ) 278 couple the IEEE 1394 interface 260 to the memory controller 240. An AGP-to-memory queue (G2MQ) 280 and a memory-to-AGP queue (M2GQ) 282 couple the AGP interface to the memory controller 240. The AGP interface 250 and the IEEE 1394 interface 260 couple by way of a IEEE 1394 to AGP queue (I2GIQ) 288 and AGP to IEEE 1394 queue 294. A CPU to IEEE 1394 queue (P2IQ) 284 and an IEEE 1394 to CPU queue (I2PQ) 286 couple the CPU interface 230 to the IEEE 1394 interface 260 as shown. An AGP-to-CPU queue 292 and a CPU to AGP queue 296 couple the AGP interface 250 to the CPU interface 230 as shown. A control logic unit 190 controls the operation of the various queue storage elements. The input and output connections to the control logic unit 290 have been omitted from FIG. 4 as have the various control signals between the interfaces 230, 250, 260 and memory controller 240.

Generally, the queue storage elements allow data and data transaction requests (such as CPU reads and writes to memory, IEEE 1394 reads and writes to memory, etc.) to be temporarily stored pending execution by the destination device, thereby permitting the requesting device to perform other tasks until its transaction request is completed. Operation and storage of data transactions in the queue storage elements preferably occurs concurrently allowing data and data transaction requests (including addresses for write requests) among the interfaces 230, 250, 260 and the memory controller 240 to be stored within the bridge logic unit 204.

Modern day computer systems that use the PCI bus to connect to PCI devices such as hard disk drives, graphics controller cards, memory subsystems, modems, audio systems, network controller cards, Universal Serial Bus (USB) peripherals, and IEEE 1394 peripheral adapters suffer from various disadvantages. As mentioned above, the PCI bus has a clock rate from 33 MHz up to 66 MHz. The PCI bus also has a maximum bus bandwidth of 32 bits, meaning that 32 bits of data can be passed during a single clock cycle. Furthermore, each data line corresponding to a bit must be impedance matched to each of the PCI device input lines. Another disadvantage of the PCI bus is that the data path timing specifications are very tightly toleranced and difficult to design into the computer system. The PCI bus can connect up to a maximum of six devices due to strict signal loading limitations. Additional PCI devices must be connected to the PCI bus through extra PCI bridges resulting in added system complexity. Furthermore, even though newer versions of PCI can potentially be faster than an IEEE 1394 bus, if a slow PCI device is placed on the PCI bus then the PCI bus must be clocked at the slower PCI device clock speed.

In comparison, many advantages of using the IEEE 1394 bus over the PCI bus as an internal computer bus to connect to peripheral devices exist. IEEE 1394 is a serial architecture that can run at speeds up to 400 Mbps (bits per second) and future designs will run at 800 Mbps and 1600 Mbps. Serial means that data bits are transferred one at a time. IEEE 1394 design tolerances are less critical because the bus was designed to connect peripheral devices through cables rather than strictly on circuit boards. The address space allocated for the IEEE 1394 bus implementation supports a maximum of 1024×64 or 65536 devices to connect to PCI-to-IEEE 1394 adapter 115. Sixty-four devices are grouped as being connected on a single IEEE 1394 bus with a maximum of 1024 buses as mentioned above supported by the address space allocation of the computer system. Another advantage of the IEEE 1394 bus is that it allows for peer-to-peer communications so that two or more computers can be networked together easily. Use of the IEEE 1394 bus connector 158 to network computers eliminates the requirement for a network interface card and allows low cost computer networks for home use. As shown in FIG. 2, the IEEE 1394 bus can be designed as a docking station interface 124 to accept notebook computers and PDAs. The docking station connectors 124 for the IEEE 1394 bus are simpler to implement and manufacturer because of reduced electrical and timing tolerance requirements. Furthermore, unlike PCI bus, the docking station does not require a separate bridge logic unit further reducing cost and simplifying design.

Devices that are coupled to 1394 bus 119 are automatically configured during initial powerup of computer system 100. If an IEEE 1394 peripheral device is attached or detached from the 1394 bus, automatic reconfiguration of all IEEE 1394 peripheral devices occur. Thus, unlike most buses used in personal computers, the IEEE 1394 bus does not depend on a single processor to execute configuration code. Instead the configuration process is localized to the IEEE 1394 bus and all IEEE 1394 peripheral device participate in configuration.

Turning now to FIG. 5, one embodiment of computer system 100 coupled to a home theatre system through an IEEE 1394 bus 158 is shown. Computer system 100 couples to a DVD Juke box 500 and High Definition Television ("HDTV") 510. The HDTV 510 couples through another 1394 bus to an amplifier/receiver 520. Speaker 530 is shown in FIG. 5 coupled to the receiver/amplifier 520 through a 1394 bus. The IEEE 1394 bus architecture supports transfer of data at a constant rate across the IEEE 1394 bus without requiring a return confirmation that the data has been received correctly. Thus, audio data can be transferred from a receiver/amplifier to amplified speakers that include IEEE 1394 decoders as shown in FIG. 5 via the 1394 bus to reproduce the sound at the speakers without distortion. Use of the IEEE 1394 bus to transfer audio data in real time results in distortion free sound because even if the audio data is corrupted in the transfer, as long as the data is present at the speaker, the corrupted data can be discarded without a major effect on the resulting audio sound.

Referring still to FIG. 5, the embodiment of the home theatre system coupled to computer system 100 can also include a Digital Versatile Disc ("DVD") 540 coupled to the receiver/amplifier 520 through another 1394 bus. The DVD 540 can couple to a Video Cassette Recorder ("VCR") 550 through another 1394 bus. Finally, in this embodiment of a home theatre system, a compact disc player ("CD") 560 can couple to the VCR 550 through another 1394 bus. Computer system 100 of the home theatre system shown in FIG. 5 can be used to control the various peripheral devices, as a means of recording signals from the various peripheral devices to generate presentations or for numerous other applications.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a CPU;
   a memory;
   a bridge logic unit coupling said CPU to said memory;
   a computer system chassis, said computer system chassis including an IEEE 1394 bus coupled to the bridge logic unit, wherein a plurality of peripheral devices in the computer system chassis couple to the bridge logic unit through the IEEE 1394 bus;
   a PCI-to-IEEE 1394 adapter that couples the bridge logic unit to said plurality of peripheral devices; and
   a PCI bus that couples the bridge logic unit to the PCI-to-IEEE 1394 adapter, wherein the PCI-to-IEEE 1394 adapter further includes:
      a PCI interface coupled to the PCI bus;
      an IEEE 1394 interface coupled to the IEEE 1394 bus; and
      a plurality of queue storage elements that couple the PCI interface and IEEE 1394 interface.

2. The computer system of claim 1 wherein an IEEE 1394 to PCI queue storage element temporarily stores data and transactions passing from said IEEE 1394 interface to said PCI Interface and an PCI to IEEE 1394 queue storage element temporarily stores data and transactions passing from said PCI interface to said IEEE 1394 interface.

3. A computer system, comprising:
   a CPU;
   a memory;
   a bridge logic unit coupling said CPU to said memory;
   a computer system chassis, said computer system chassis including an IEEE 1394 bus coupled to the bridge logic unit, wherein a plurality of peripheral devices in the computer system chassis couple to the bridge logic unit through the IEEE 1394 bus;
   a memory bus that couples the memory to the bridge logic unit, wherein the bridge logic unit includes a memory controller;
   a CPU bus that couples the CPU to the bridge logic unit, wherein the bridge logic unit includes a CPU interface;
   an IEEE 1394 interface in the bridge logic unit coupled to the IEEE 1394 bus;
   an AGP bus that couples a graphics controller to the bridge logic unit, wherein the bridge logic unit includes an AGP interface; and
   wherein the bridge logic unit includes a plurality of queue storage elements that couple the IEEE 1394 interface to the memory controller, CPU interface, and AGP interface.

4. The computer system of claim 3 wherein one of said plurality of peripheral devices is a mouse.

5. The computer system of claim 3 wherein one of said plurality of peripheral devices is a fiber optic device.

6. The computer system of claim 3 wherein one of said plurality of peripheral devices is a docking station.

7. The computer system of claim 3 wherein one of said plurality of peripheral devices is a Compact Disc-Rewritable ("CD-RW") device.

8. The computer system of claim 3 wherein one of said plurality of peripheral devices is a Digital Versatile Disc ("DVD") device.

9. The computer system of claim 3 wherein one of said plurality of peripheral devices is a Floppy Disk Drive ("FDD") device.

10. The computer system of claim 3 wherein one of said plurality of peripheral devices is an IEEE 1394 external connector.

11. A computer system, comprising:
    a CPU;
    a memory;
    a bridge logic unit coupling said CPU to said memory, wherein a memory bus couples the memory to the bridge logic unit, wherein a CPU bus couples the CPU to the bridge logic unit, wherein the bridge logic unit includes a memory controller and a CPU interface;
    an AGP bus that couples a graphics controller to the bridge logic unit, wherein the bridge logic unit includes an AGP interface, a computer system chassis, said computer system chassis including an IEEE 1394 bus coupled to the bridge logic unit, said bridge logic unit including an IEEE 1394 Interface, wherein a plurality of peripheral devices In the computer system chassis couple to the bridge logic unit through the IEEE 1394 bus, said plurality of peripheral devices including a keyboard; and wherein the bridge logic unit includes a plurality of queue storage elements that couple the IEEE 1394 interface to the memory controller, CPU interface AGP interface.

12. A method of using the IEEE 1394 bus in a computer system including a computer system chassis, comprising:

connecting an internal peripheral device to the IEEE 1394 bus, wherein the IEEE 1394 bus is an internal bus located inside the computer system chassis; and switching on power to said computer system, wherein the internal peripheral device is automatically configured during power-up of the computer system, wherein said computer system includes a PCI bus that couples a bridge logic unit to a PCI-to-IEEE 1394 adapter connected to the IEEE 1394 bus, wherein the PCI-to-IEEE 1394 adapter further includes:
a PCI interface coupled to the PCI bus;
an IEEE 1394 interface coupled to the IEEE 1394 bus; and
a plurality of queue storage elements that couple the PCI interface and IEEE 1394 interface.

13. The method of claim 12, wherein said computer system further includes:

a memory bus that couples a memory to a bridge logic unit, wherein the bridge logic unit includes a memory controller;

a CPU bus that couples a CPU to the bridge logic unit, wherein the bridge logic unit includes a CPU interface;

an IEEE 1394 interface in the bridge logic unit coupled to the IEEE 1394 bus;

an AGP bus that couples a graphics controller to the bridge logic unit, wherein the bridge logic unit includes an AGP interface; and wherein the bridge logic unit includes a plurality of queue storage elements that couple the IEEE 1394 interface to the memory controller, CPU interface, and AGP interface.

14. A computer system, comprising:

a CPU;

a plurality of peripheral devices;

a bridge logic unit coupling said CPU to said plurality of peripheral devices:

a computer system chassis, said computer system chassis including an IEEE 1394 bus coupling said bridge logic unit to said plurality of peripheral devices;

a memory coupled to the bridge logic unit;

a graphics controller coupled to the bridge logic unit;

an IEEE 1394 interface in the bridge logic unit coupled to the IEEE 1394 bus; and wherein the bridge logic unit includes a plurality of queue storage elements that couple the IEEE 1394 interface to the CPU, memory and graphics controller.

* * * * *